April 17, 1956
C. M. WESTFALL
2,742,554
WELDING HEAD MOUNT
Filed Oct. 29, 1953
3 Sheets-Sheet 2
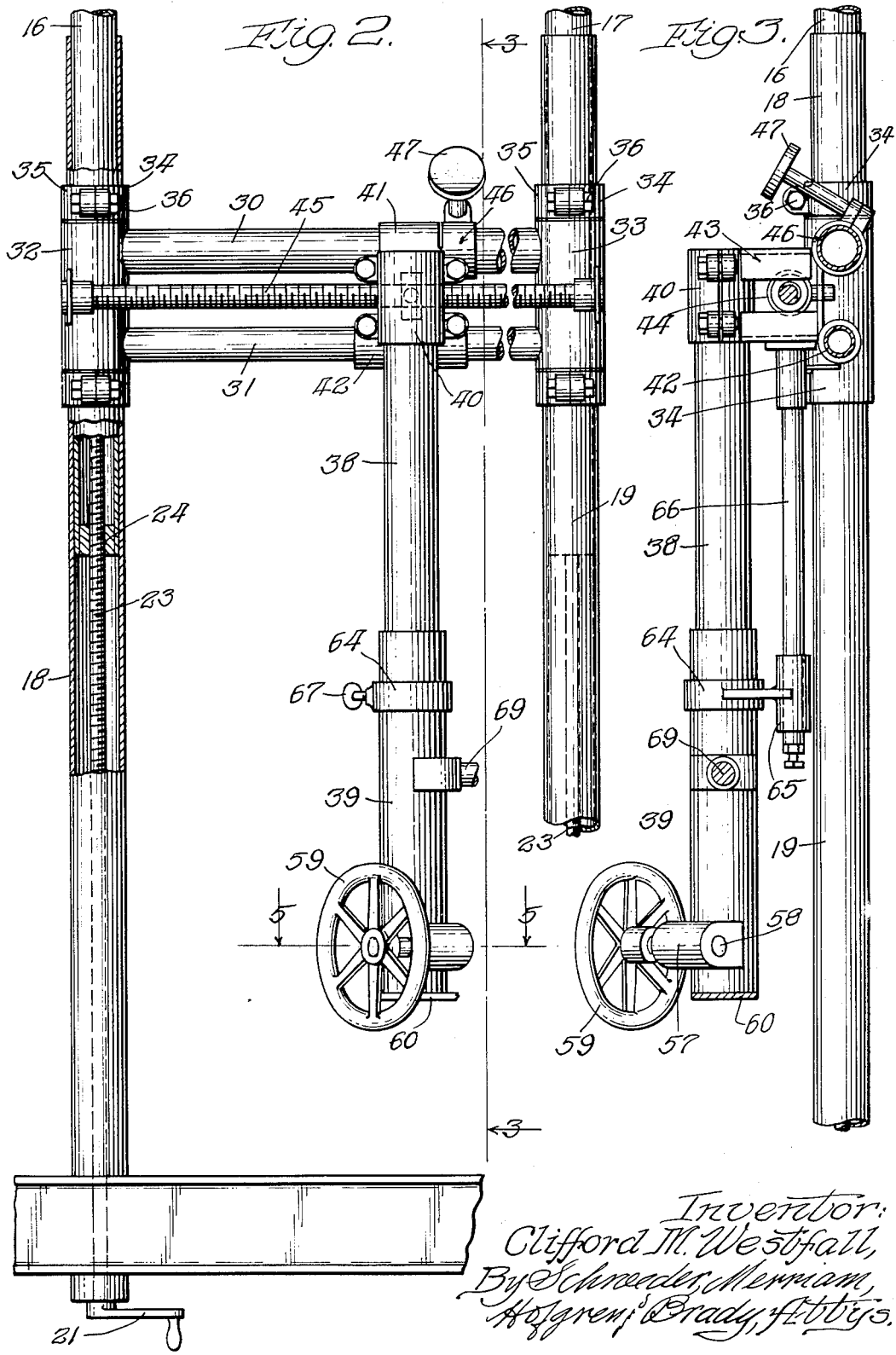

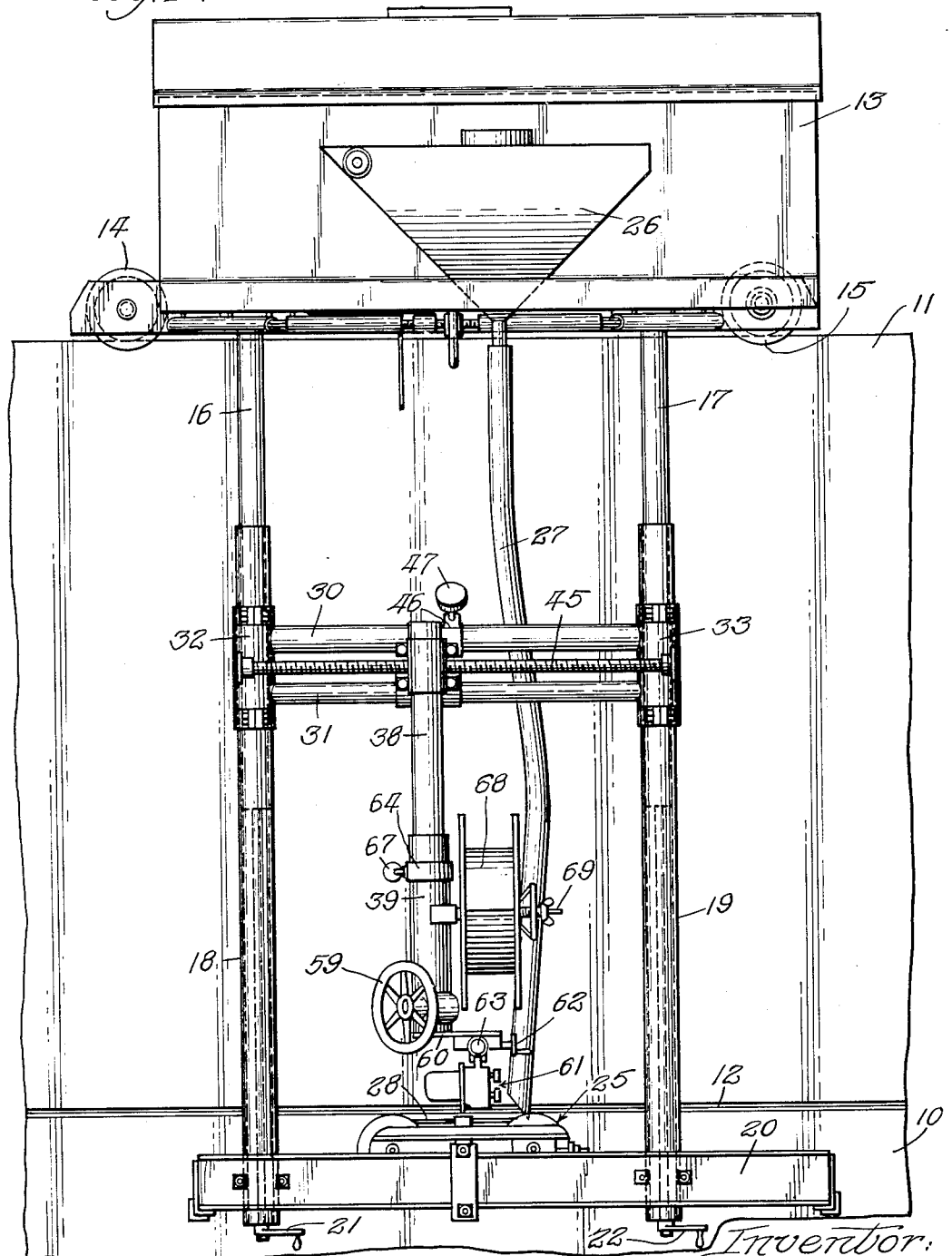

April 17, 1956  C. M. WESTFALL  2,742,554
WELDING HEAD MOUNT
Filed Oct. 29, 1953  3 Sheets-Sheet 3

Inventor:
Clifford M. Westfall,
By Schroeder, Merriam,
Hofgren & Brady, Attys.

United States Patent Office 2,742,554
Patented Apr. 17, 1956

2,742,554

WELDING HEAD MOUNT

Clifford M. Westfall, Homewood, Ill., assignor to Chicago Bridge & Iron Company, a corporation of Illinois Application October 29, 1953, Serial No. 389,061

12 Claims. (Cl. 219—8)

This invention relates to welding of horizontal joints between upright plates and more particularly to weld head supporting apparatus for a machine used to perform such welding.

Very recently, submerged arc welding of horizontal joints (sometimes referred to as "seams") has been used in the oil storage industry for welding girth joints of large field-erected storage tanks. A particular problem exists in performing such field welding in that the plates forming the shell of the tank, of necessity, must be welded at the lower edge after they are placed in position on the tank shell. To perform such welding, a carriage structure is mounted on the temporarily positioned plate and supports a welding apparatus, including a welding head, at the joint below the carriage. Thus, in fact, the machine is riding on the plate which it is welding into the tank shell.

The shell plates of such tanks are rectangular in plan before being rolled into shape. The edges are sheared, burned, or machined fairly accurately but the adjoining surfaces may be slightly irregular. The travel of the welding apparatus may in part be affected by such surface irregularities. To perform a satisfactory welding job, the arc struck between the welding wire and the plates should be continuous and of the same voltage to deposit fairly uniform amounts of weld metal at a uniform heat. A joint is covered with a layer of flux so that the welding wire from which the arc is struck is invisible to an operator. Welding heads are given certain controls which adjust the rate of feed of the weld wire to compensate for some irregularities. It is important, however, that the head be supported quite firmly with relation to the plates in order to assist the known controls in performing a good welding job.

In the past, attempts have been made to support the welding head by a weighted lever system so that the head supporting structure in effect rode against the plates with small wheels rolling over the plate surfaces. This has not proved satisfactory in all applications since plate surface irregularities have interfered with the operation of such a support for the welding apparatus. The problem is complicated by the additional requirement of a readily adjustable position for the welding head since all plates in all welding set-ups are not of the same depth so that the welding head may have to be adjusted considerably in its position to reach the joint upon which the work is to be done. The combination of a fairly firm and rigid mount for the welding head plus the adjustability required makes the supporting of the head of particular importance.

In general, the present invention provides a weld head mount which supports the welding apparatus firmly in position at the seam to be welded and incorporates readily adjustable features by which the operator's welding time may be increased over the total elapsed time. In welding procedures, an attempt is made to get as much welding time in a working day as is possible. All time necessary for adjustments of the machinery used or in setting up the machinery is, in fact, lost time, as far as production is concerned. The adjustable features of the present invention tend to minimize this lost time to a great extent.

A preferred embodiment of the present invention is illustrated in the accompanying drawings, in which:

Figure 1 is a front elevation of the apparatus with some parts removed for sake of clarity showing the apparatus mounted upon a field-erected tank shell in position to weld a girth seam;

Figure 2 is a fragmentary enlarged front elevation partly in section showing a portion of the weld head supporting structure;

Figure 3 is a fragmentary sectional view taken substantially along line 3—3 in Figure 2;

Figure 4:
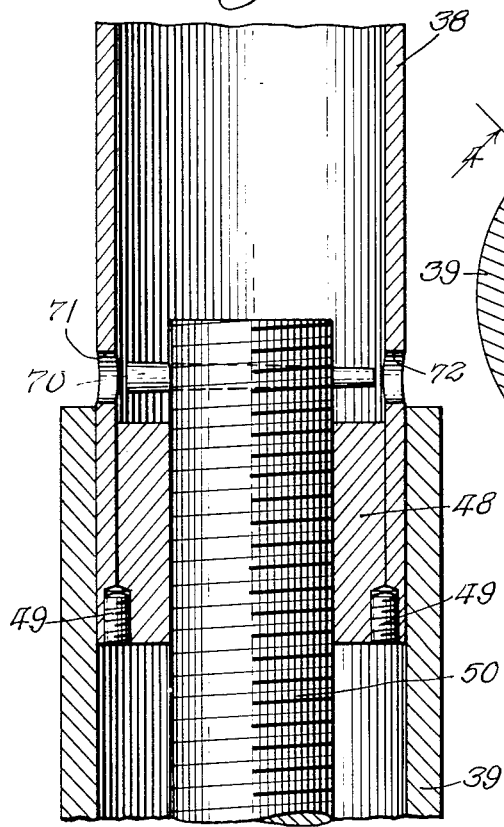
Figure 4 is a fragmentary sectional view taken substantially through the center of the upright member and substantially along line 4—4 of Figure 5.

Field-erected liquid storage tanks may range in diameter up from 150 ft. to 200 ft. and in some instances may be made in smaller sizes. Petroleum products as well as chemicals and other liquids may be stored in large barrel quantities in such tanks. The tank itself may comprise a bottom of plates placed on a prepared foundation and a generally cylindrical sidewall formed of courses of plates placed one on top of the other. The particular welding performed by the machine illustrated in the drawing is referred to as girth welding in that the joint to be welded is horizontal between vertically arranged plates. The weld wire is directed laterally from either side toward the joint. The girth joints of liquid storage tanks extend continuously about the tank and may be welded continuously so that a ring of weld around the tank shell may be completed before the welding operation is stopped. In practice, probably less than a full ring of plates at a girth joint would be welded at one time due to the requirements of the erection crews in temporarily placing the plates in position on previously placed courses of plates.

As mentioned above, the machine of the present invention sits upon and travels over the plate which it is welding into the tank structure. In Figure 1, a bottom plate 10 is surmounted by upper plate 11 so that their abutting edges form a horizontal joint 12. This joint is called a girth joint and is the joint with which the present welding apparatus is concerned. The welding machine has a chassis hidden below a supporting member 13 and supported by a pair of wheels 14 and 15 which are arranged in tandem. These wheels are grooved to fit over the upper edge of the plate 11 and the leading wheel 15 is driven by a motor at predetermined rates of speed depending upon the rate at which the weld metal is to be deposited. The particular machine is adapted for welding both sides of a girth joint 12 at one time and has a framework depending from the chassis on either side of the plate 11, and includes a pair of parallel posts 16 and 17 which have telescoping lower portions 18 and 19 so that the portion of a bottom channel 20 may be adjusted relative to the chassis by means of crank members 21 and 22. This specific detail of the arrangement may be seen in Figure 2 wherein it is noted that the crank is connected to the threaded shaft 23 passing through a nut 24 secured to the post 16.

The channel member 20 at the bottom of the post is secured thereto by a U-bottom clamp and supports a flux belt generally indicated 25. Flux from a hopper 26 adjacent the member 13 is conducted by a gravity pipe 27 to be deposited upon the belt 28 ahead of the welding wire. The flux covers the seam 12 and the wire extends through the flux so that the arc is struck below the layer of flux.

At least one depending framework is hanging to the chassis so that the lower ends of the two frameworks may be separated to permit a crane to lift the apparatus from the ground and fit it upon the shell plates. Suitable means such as springs or otherwise may be used for forcing the lower ends of the depending frameworks toward the shell plates so that each belt carrier 25 is pressed against the shell plates with a considerable amount of force. The structure in general is quite rigid so that the flux belt carrier will travel along the plates at the same rates as the chassis riding along the upper edge of the plates.

The particular weld head mount of this invention does not depend upon gravity nor is it pressed against the shell plates to position the welding head and wire at the seam 12. The welding head is suspended from the depending framework in such a way that it is rigidly held in position and is little affected by irregularities in the plate surface either at the seam or along the upper edge where the wheels of the chassis roll. The particular structure includes a pair of horizontal guide bars 30 and 31 both connected to a collar 32 at one end and a similar collar 33 at the other. These guide bars are arranged one above the other and the collars 32 and 33 are clamped to the lower portions 18 and 19 of the posts. The clamps are formed as bifurcated portions 34 and 35 of the collars connected together by a bolt 36 passing through lugs secured to the bifurcated portions. Four clamps are shown, two used with each collar. The position of the guide bars may thus be adjusted vertically of the supporting posts as well as by the adjustment provided in each post itself.

The member which supports the welding head is composed of two telescoping tubular parts 38 and 39, the part 38 being secured by a collar 40 to a pair of sleeve members 41 and 42 respectively, slidably mounted on the guide bars 30 and 31. The collar 40 has a relatively heavy portion generally indicated 43 for holding the upright support member outwardly from the guide bars. In addition, a central portion 44 is threaded to receive a threaded traverse shaft 45 which is channeled at the collars 32 and 33. By placing a small hand crank on the traverse shaft 45, the upright member may be moved bodily between the upright posts 18 and 19. The upper sleeve 41 is slit in part to provide a clamp generally indicated 46 which can be tightened by means of a hand wheel 47 to lock the sleeve to the guide bars in firm position. While the sleeves slide on the guide bars, their fit is fairly close so that little play exists. When the clamp 46 is tightened, the connection is practically rigid for all intents and purposes.

Figure 5:
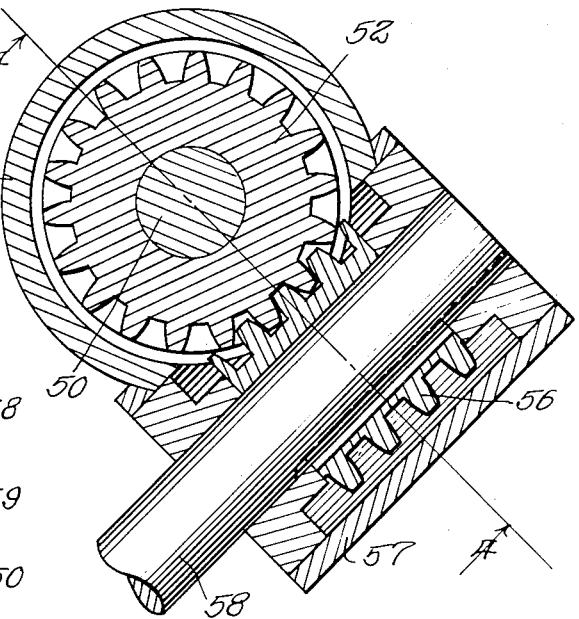
Figure 5 is a horizontal sectional view taken substantially along line 5—5 in Figure 2.

The internal structure of the upright supporting member is best seen in Figures 4 and 5. The upper tubular member 38 slides inside the lower member 39. A nut 48 is secured by locking screws 49 in the upper member so as to receive a threaded shaft 50 journaled in the lower member for rotation therein by means of a bearing block 51 seated in the lower portion of member 39. Shaft 50 has a worm wheel 52 (Fig. 4) keyed thereto and positioned between two thrust washers. The shaft and worm wheel are held against downward axial movement by a collar 53 secured in member 39 by a screw 54 and engaging one thrust washer and against upward axial movement by a nut 55 threaded upon the lower end of shaft 50. A worm gear 56 is housed in a tubular portion 57 attached to the lower member 39 in such a way that the gear is in mesh with the worm wheel. This worm gear is mounted on a short stub shaft 58 which has an external hand wheel 59 which can be turned to cause the lower member to telescope with relation to the upper member 38. The fit is tight so that practically no play is permitted between the telescoping members.

This mount has the advantage of tightly securing a weld head in proper position while at the same time providing quick and easy adjustment of the position of the weld head. A plate 60 on the bottom of the lower member 39 supports a weld head generally indicated 61. Small hand wheels 62 and 63 forming a part of the weld head structure provide small adjustments of weld head position in two directions in a horizontal plane. When the adjustment of the welding head position has been made by use of the traverse screw 45 and hand wheel 59 for raising and lowering the telescoping parts of the member, the clamps 46 and 64 may be applied to hold the adjustment made. Clamp 64 is a collar mounted about the lower telescoping member 39 and has a sleeve 65 sliding upon a guide rod 66 which is secured rigidly to the support structure 43 of the telescoping member. A small hand wheel 67 is provided for tightening this clamp member which will then prevent any rotation of the telescoping members.

A particularly important feature of the invention is the structure whereby the lower telescoping member 39 may be rotated relative to the upper member to swing the welding head and the nozzle and reel 68 for the weld wire outwardly from the plates and seam being welded. The rotation occurs between the threads of the shaft 50 and the meshing nut 48. A slight vertical movement will, of course, occur with such rotation but upon return of the apparatus to its initial position, this vertical movement is eliminated since the swinging is out and back in the same path and the same threads. The weld rod reel is mounted on a spindle 69 secured to the lower support member 39 so that it swings along with the weld head.

Several details of the construction of the apparatus are illustrated in the drawings without specific description since it is believed that the proper inference is obvious. In Figure 4, it will be noticed that pin 70 may pass through openings 71 and 72 in the upper member to keep the telescoping members from becoming so far extended as to come apart. In the structure around the worm wheel and gear, the usual washers and bearing members are provided to take the thrust that may be transmitted through the threaded shaft.

In the present invention, the necessary mechanical expedients are used so that the welding head is supported from the guide bars 30 and 31 and does not depend on a roller traveling against the plates to position the welding head relative thereto. The flux belt unit 25 is pressed against the plates and this, in turn, partly effects the position of the welding unit since the bearing is carried through the depending framework to the chassis of the machine. When an operator welds a desired distance along the seam, he may wish to reverse his direction so as to return to the beginning of the seam and make a second pass. In such instances, it is only necessary to release the clamp 64 and swing the welding head away from the plates whereupon the machine can be transferred rearward over the plates at a more rapid rate. At the beginning of the seam, the weld head may again be swung to the seam in the proper position and any adjustments made through wheels 62 and 63 whereupon the arc may be struck and the bead deposited along the seam in the same direction as before. In general practice, erection crews may put up approximately half of a tank shell at a time so that in some instances it is is desirable to completely weld about half of a girth seam before passing on to the other half of the same seam. This is a practice used in the erection of the tank plates and is not a limitation in the welding apparatus.

The foregoing detailed description has been given for clearness of understanding only, and no unnecessary limitations should be understood therefrom, for some modifications will be obvious to those skilled in the art.

I claim:

1. In a welding machine having a chassis and depending framework for carrying welding equipment along a generally horizontal joint between upright plates, a weld head mount comprising: a pair of generally horizontal guide bars secured to the framework of the machine, a weld head supporting member extending upright and secured to the guide bars for movement therealong, said guide bars holding said supporting member rigidly in selected position, said supporting member having telescoping portions, one secured to the guide bars and the other movable longitudinally and rotatably relative to said one, a weld head mounting bracket on said supporting member remote from said guide bars, and releasable means for clamping said supporting member in a selected position relative to the welding machine framework.

2. In a welding machine having a chassis, means on said chassis for engaging and traveling along the upper edges of vertically arranged plates being welded and framework depending from said chassis for carrying welding equipment along a generally horizontal joint between upright vertical plates, a weld head mounting bracket comprising: an upright weld head supporting member having a pair of telescoping portions, one portion being secured to the depending framework of the welding machine and the other portion having a weld head mounting bracket thereon, means for adjusting said portions relative to each other to permit selected vertical positioning of the weld head mounting bracket, releasable means for clamping said portions together to prevent relative movement therebetween and to hold a weld head firmly in selected position, and means providing relative rotation of the telescoping portions to permit swinging of the weld head toward and away from welding position.

3. In a welding machine having a chassis and depending framework for carrying welding equipment along a generally horizontal joint between upright plates, a weld head mount comprising: a pair of horizontally disposed guide bars secured to the framework of the welding machine, an upright member mounted for horizontal sliding movement along the guide bars, said upright member having telescoping portions and a weld head mounting bracket movable relative to the guide bars upon telescoping movement of the upright member, means for locking said movable connections to position the weld head mounting bracket in a selective position relative to the depending framework, and means for rotating said mounting bracket with a portion of said upright member to swing a weld head toward and away from the work without affecting its selected position relative to the welding machine.

4. A weld head mount as specified in claim 3 in which the upright member includes a pair of telescoping tubular members, a threaded shaft rotatably secured to one member and engaging a nut secured in the other member, one of said portions being rotatable about the other on the threads between said shaft and nut.

5. A weld head mount as specified in claim 4 in which a worm wheel is secured to said threaded shaft and is rotatable by a worm gear meshing therewith, said gear having external means for manual turning of the gear for raising and lowering the weld head mounting bracket.

6. A weld head mount as specified in claim 3 in which a threaded traverse shaft is rotatably secured between said guide bars and said upright member is provided with a nut threaded upon said shaft whereby turning of said shaft may bodily move the upright member horizontally relative to the framework.

7. In a welding machine having a chassis and depending framework for carrying welding equipment along a generally horizontal joint between upright plates, a weld head mount comprising: a pair of parallel rigid guide bars secured to the framework and extending horizontally, an upright member mounted and slidable horizontally on said guide bars and having a weld head mounting bracket thereon, said upright member having telescoping portions intermediate the mounting bracket and guide bars, and slidable mounting and telescoping portions providing horizontal and vertical adjustment of the mounting bracket positions relative to the welding machine framework, releasable means for clamping said mounting bracket in selected positions, and means for rotating the weld head mounting bracket about the axis of the upright member to swing a weld head and nozzle toward and away from the welding position without changing its selected adjusted position.

8. In a welding machine for automatically welding girth joints of field-erected storage tanks, a chassis adapted to track upon the upper edges of plates being welded into the tank side wall, a depending framework secured to the chassis and including a pair of spaced posts, a pair of generally horizontal guide bars secured to the posts one above the other, a weld head supporting member extending upright and mounted upon said guide bars for sliding movement bodily therealong, means for clamping the supporting member to said guide bars whereby the bars may firmly hold the supporting member in fixed selected position, said supporting member having telescoping portions with the portion remote from the guide bars having a weld head bracket thereon, a threaded shaft in one portion and a cooperating nut secured in the other portion for lengthening and shortening the supporting member, said portion having the weld head bracket being rotatable on the cooperating threads of said shaft and nut to permit swinging a weld head toward and away from welding position and releasable clamping means for securing the telescoping portions rigidly in selected positions of adjustment relative to the chassis and depending framework of the welding machine.

9. In a welding machine as specified in claim 8, a threaded traverse shaft intermediate the guide bars and a mating threaded member on the upright supporting member for adjustably moving a weld head laterally of the depending framework, and clamp means for securing same in selected position.

10. In a welding machine as specified in claim 8, a worm wheel secured to the threaded shaft and a manually rotatable worm gear meshed therewith for raising and lowering the weld head mounting bracket relative to the chassis.

11. In a welding machine as specified in claim 8, a guide rod extending upright beside and parallel to the supporting member and a clamp ring extending about the telescoping portion supporting the weld head mounting bracket and having a journal slidable along said rod whereby clamping of the ring on said telescoping portion anchors the weld head supporting bracket against swinging movement.

12. The welding machine as specified in claim 8 in which the posts are tubular and the guide bars are adjustably clamped to the posts for bodily movement of the weld head supporting member and guide bars vertically on the framework.

References Cited in the file of this patent

UNITED STATES PATENTS 2,229,570   Howard _____ Jan. 21, 1941